United States Patent
Eslambolchi et al.

[11] Patent Number: 6,044,744
[45] Date of Patent: Apr. 4, 2000

[54] FIBER OPTIC CABLE SHEATH REMOVAL TOOL

[75] Inventors: Hossein Eslambolchi, Basking Ridge, N.J.; John Sinclair Huffman, McDonough, Ga.

[73] Assignee: AT&T Corp., New York, N.Y.

[21] Appl. No.: 09/182,028

[22] Filed: Oct. 29, 1998

[51] Int. Cl.⁷ .................................................. B21F 13/00
[52] U.S. Cl. .............................................. 83/880; 30/90.7
[58] Field of Search ..................... 30/90.4, 90.6, 30/90.7, 90.8, 90.2, 90.1, 90.3; 81/9.4, 9.51; 29/825, 426.4; 83/861, 880

[56] References Cited

U.S. PATENT DOCUMENTS

| | | | |
|---|---|---|---|
| 3,886,655 | 6/1975 | Molnar | 30/90.3 |
| 4,062,110 | 12/1977 | Alvarez | 30/90.8 |
| 4,656,893 | 4/1987 | Hudson | 30/90.4 |
| 5,487,220 | 1/1996 | Saitou | 30/90.6 |

FOREIGN PATENT DOCUMENTS

| | | | |
|---|---|---|---|
| 00682238 | 1/1999 | European Pat. Off. | 81/9.4 |
| 3905694 | 4/1990 | Germany | 30/90.1 |
| 2147151 | 5/1985 | United Kingdom | 30/90.1 |

*Primary Examiner*—Kenneth E. Peterson
*Assistant Examiner*—Omar Flores-Sánchez
*Attorney, Agent, or Firm*—Robert B. Levy

[57] ABSTRACT

A cutting tool (10) for making precise circumferential and longitudinal cuts in an fiber optic cable (12) includes a rotary-driven cutting wheel (18) that extends partially into the top of a housing (24) having an open bottom. The housing receives a pair of upper and lower cable guides that have opposed longitudinal and transverse channels (36 and 42) and 38 and 44) for retaining the cable in a longitudinal and transverse relationship, respectively with the cutting wheel. A cable lock guide (48) attaches to the bottom of the housing to maintain the guides in a fixed relationship while an adjustment mechanism (52) extends through the guide lock to displace the guides (and the cable retained therebetween) towards the cutting wheel to control the depth of cut. By placing the cable in the longitudinal channels in the guides, the tool can make a longitudinal cut when displaced along the axis of the cable. By placing the cable in the transverse channels in the guides, the tool can make a circumferential cut when rotated about the cable axis.

12 Claims, 3 Drawing Sheets

FIBER OPTIC CABLE SHEATH REMOVAL TOOL

TECHNICAL FIELD

This invention relates to a technique for removing the protective layers (e.g., the sheath) of a fiber optic cable to facilitate a repair.

BACKGROUND ART

Presently, many telecommunications carriers, such as AT&T, use fiber optic cables to carry optically formatted telecommunications traffic between facilities. A typical fiber optic cable comprises one or more individual optical fibers surrounded by a buffer tube that is enclosed by metal jacket covered by a plastic sheath. To repair one of more damaged fibers, a technician must remove a portion of the plastic sheath, the metal jacket and the buffer tube to expose the damaged fiber(s) without causing injury to any undamaged fibers. Heretofore, a technician manually exposed the damaged fiber(s) using a knife or saw, often a slow and dangerous operation. Indeed, technician, despite exercising extreme care, some times would slip with the knife or saw, causing injury as well as possibly damaging one or more undamaged fibers.

U.S. Pat. No. 5,457,877, issued in the name of Patrick McDermott, and originally assigned to AT&T, discloses an apparatus for cutting through the sheath of a fiber optic cable of the type described above to avoid the difficulties associated with sheath removal by hand. The McDermott tool comprises a rotary-driven cut-off wheel enclosed within a guide box so that a portion of the wheel extends beyond the top of the guide box. The box has an upwardly extending end wall in spaced-apart parallelism with the cut-off wheel. The end wall has a generally "U"-shaped notch in its upper edge for seating the cable. By rotating the cable relative to the cut-off wheel, an operator can make a circumferential cut into the cable sheath. Thereafter, the operator removes the cable from the notch and places it in abutment with the end wall to make a cut in the sheath along the longitudinal cable axis.

While the McDermott tool avoids the dangers associated with sheath removal by and, the tool does not generally possess the precision needed for removing the protective layers of an active fiber optic cable without damaging the signal-carrying fibers. Moreover, the McDermott tool does not readily accomplish removal of long longitudinal portions of the cable sheath.

Thus, there is a need for a technique for removing the sheath of a fiber optic cable or the like which overcomes the aforementioned disadvantages of the prior art.

BRIEF SUMMARY OF THE INVENTION

Briefly, in accordance with a preferred embodiment, the present invention discloses a tool for cutting the protective layers (e.g., the sheath) of a fiber optic cable or the like. The tool includes a rotary-driven cutting wheel that partially extends into an opening in the top of a housing having an open bottom for receiving an upper and lower cable guides mated one above the other to circumscribe the cable. The cable guides have opposed longitudinal channels that run the length of the guides parallel the face of the cutting wheel for retaining the cable to facilitate a longitudinal sheath cut by the cutting wheel. The guides also have opposed transverse channels running the width of the guides perpendicular to, and, and intersecting with, the longitudinal channels, for seating the cable perpendicular to the face of the cutting wheel to facilitate a circumferential sheath cut. A cable guide lock releasably attaches to bottom of the housing to retain the upper and lower cable guides within the housing to hold the cable in a fixed relationship with the cutting wheel. An adjusting mechanism extends through the cable guide lock to displace the upper and lower cable guides, and the cable circumscribed thereby, towards the cutting wheel to control the depth of cut of the cutting wheel into the cable.

A technician makes a longitudinal sheath cut by placing the cable in the longitudinal channels of the upper and lower cable guides and then placing the guides (with the cable circumscribed thereby) into the housing before attaching the cable guide lock to the housing. Next, the technician manipulates the adjusting member to displace the cable guides, and hence, the cable, to establish the depth of cut by the wheel. Lastly, the technician displaces the tool relative to the cable along its longitudinal axis. To make a circumferential sheath cut, the technician places the cable in the transverse channels of the upper and lower cable guides and then places the guides (with the cable circumscribed thereby) into the housing before attaching the cable guide lock to the housing. Next, the technician manipulates the adjusting mechanism to displace the cable guides, and hence, the cable, to establish the depth of cut of the wheel. Lastly, the technician rotates the tool relative to the cable about its circumference. For both longitudinal and circumferential sheath cuts, the cable guides maintain the cable in a fixed relationship with the cutting wheel, thus assuring a precision cut.

DETAILED DESCRIPTION

FIGS. 1–4 depict an improved tool 10 in accordance with the invention for making both circumferential and longitudinal cuts in a cable 12 (see FIGS. 3 and 4) to facilitate removal of one or more protective layers (e.g., the sheath) of the cable. For purposes of discussion, a circumferential cut is a cut made in to the cable about its circumference at a substantially constant radius. A longitudinal sheath cut is a cut made into the cable along its longitudinal axis.

Figure 1:
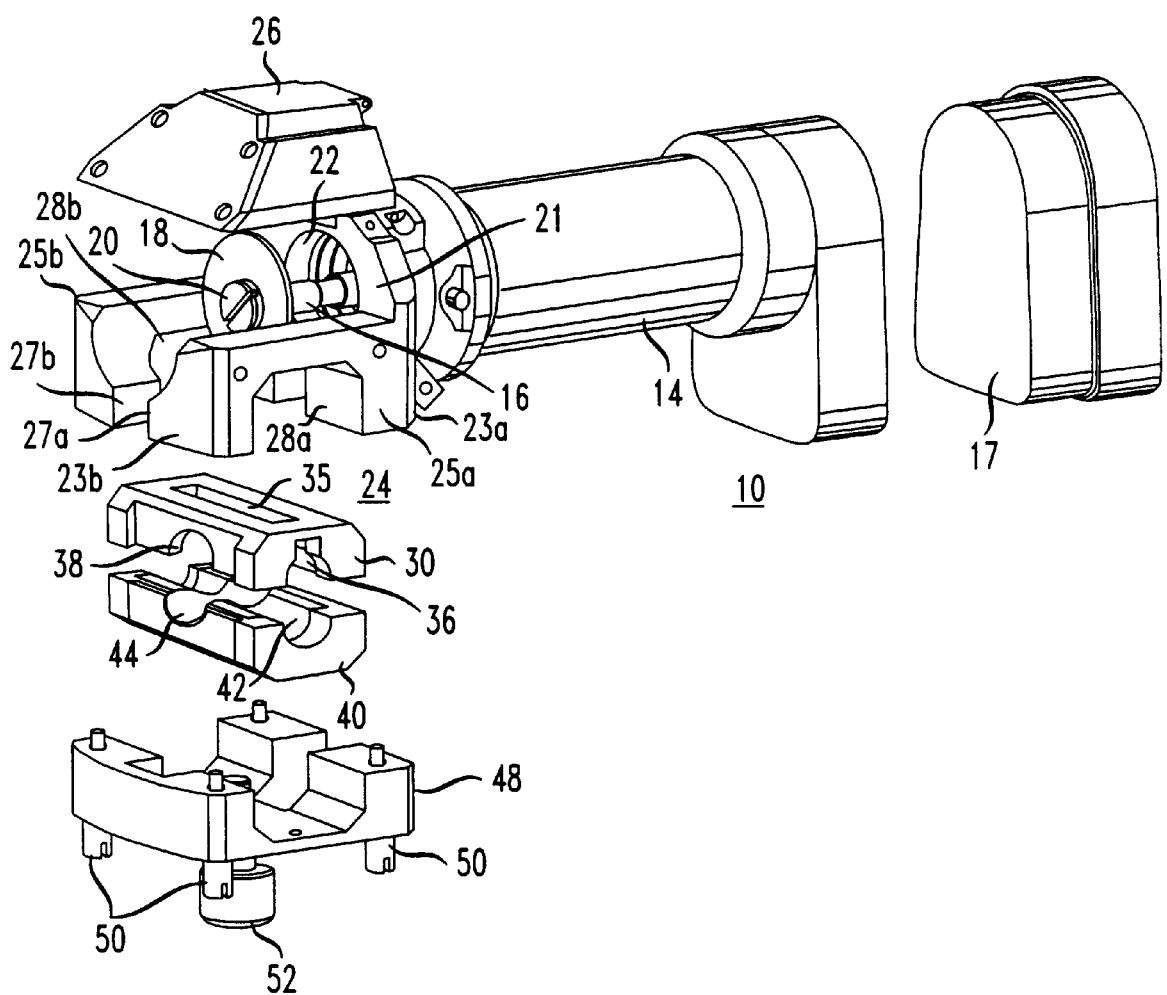
FIG. 1 illustrates an exploded side view, in perspective of a fiber optic sheath removal tool in accordance with the invention.

The tool 10 comprises a motor 14 powered by a rechargeable energy source 17, such as a rechargeable battery pack. As best seen in FIG. 1, the motor 14 drives a shaft 16 that carries a cutting wheel 18 attached to the motor shaft by a threaded fastener 20. The cutting wheel 18 generally comprises a carbide disc, as shown, or a saw blade (not shown), capable of cutting through the protective layers (e.g., the sheath) of the cable 12 of FIGS. 3 and 4.

Still referring to FIG. 1, the motor 14 mounts a flange 21 having an opening 22 through which the motor shaft 16 extends. The flange 21 is integral with, and extends upwardly from one of the opposed sides 23a and 23b of a housing 24 having opposed ends 25a and 25b. The housing 24 has an open bottom and an open top, the later enclosed by a removable cover 26. The housing sides 23a and 23b have opposed openings 27a and 27b, respectively, aligned parallel to the shaft 16. The openings 27a and 27b are sized large enough to receive the cable 12 (see FIGS. 3 and 4) to permit the cutting wheel 18 to make a circumferential cut in the cable as described hereinafter with respect to FIG. 3.

Figure 2:
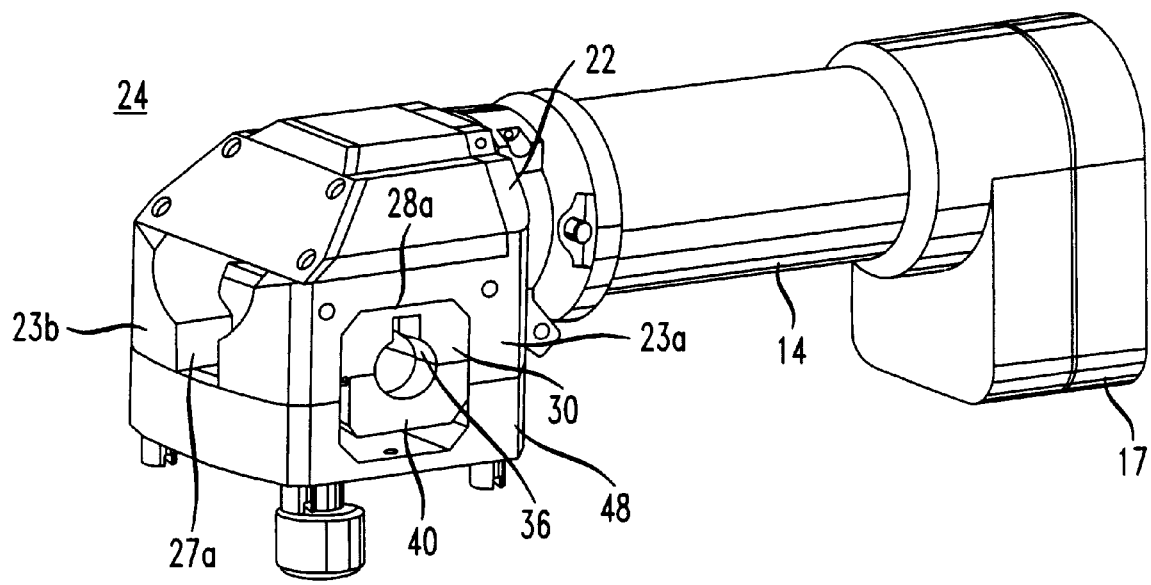
FIG. 2 illustrates a side view of the fiber optic sheath removal tool in accordance with the invention fully assembled.

The ends 25a and 25b of the housing 24 have opposed openings 28a and 28b, respectively, in aligned registration with each other perpendicular to the axis of the shaft 16. The end openings 28a and 28b each have a generally horizontal top and two parallel sides, the sides terminating with the open bottom of the housing 24 for receiving an upper cable guide 30. The upper cable guide 30 is generally parallelepiped in shape and has a slot 35 in its top for receiving the lower portion of the cutting wheel 18 when the cable guide is received in the bottom of the housing 24 as seen in FIG. 2.

As seen in FIG. 1, a generally half-rounded longitudinal channel 36 runs the length of the bottom of the upper cable guide 30. A half-rounded transverse channel 38 runs the width of the bottom of the upper guide cable 30 perpendicular to, and intersecting with, the channel 36. The upper cable guide 30 mates with the top of a complementary lower cable guide 40 having longitudinal and transverse channels 42 and 44. The channels 42 and 44 run along the length and width, respectively, of the top of the lower cable guide 40 in aligned registration with the channels 36 and 38, respectively, in the upper cable guide 30. In this way, the upper and lower cable guides 30 and 40 circumscribe the cable 12 when the cable is seated in the longitudinal cable guide channels 36 and 42 or when the cable is seated in the transverse cable guide channels 38 and 44.

To assure a precise sheath cut, the longitudinal channels 36 and 42 and the transverse channels 38 and 44 are sized for a particular diameter cable 12. Thus, different size cables, require separate pairs of upper and lower cable guides 30 and 40, with the appropriately sized longitudinal and transverse channels 36 and 42, and 38 and 44, respectively. Ideally, a single pair of upper and lower cable guides 30 and 40 enables both circumferential and longitudinal sheath cuts in a particular diameter cable. However, in some instances, separate pairs of upper and lower cable guides members 30 and 40 may be necessary for circumferential and longitudinal sheath cuts in the same cable 12.

As best seen in FIG. 1, a cable guide lock 48 mounts to the bottom of the housing 24 to retain the upper and lower cable guides 30 and 40 within the housing, thereby maintaining the cable 12, when circumscribed by the guides, in a fixed position relative to the cutting wheel 18. In the illustrated embodiment of FIG. 1, a plurality of threaded fasteners 50—50 extend upward through the cable guide lock 48 for receipt in corresponding threaded passages (not shown) in the bottom of the housing 24. When the threaded fasteners 50—50 fully engage the housing 24, the cable guide lock 48 restrains the upper and lower cable guides 30 and 40 against lateral movement, yet permits the guides to enjoy a small degree of vertical movement. Rather than make the cable guide lock 48 completely detachable from the housing 24 as seen in FIG. 1, the cable guide lock could be hinged at one of its sides or ends to the housing. A single fastener 50 or a pair of such fasteners would then secure the cable guide lock 48 to the housing 24. Alternatively, the cable guide lock 48 could include a pair of raised, spaced-apart lips (not shown) for engaging corresponding channels (not shown) in the housing 24 to retain the cable guide lock to the housing.

An adjusting mechanism 52, comprised knurled knob at the lower end of a shaft threaded vertically through the cable guide lock 48, serves to vertically displace the upper and lower cables guides 30 and 40 towards the cutting wheel 18 of FIG. 1. By manipulating the adjusting mechanism 52, a technician can effectively control the depth to which the cutting wheel 18 extends through the slot 35 of the upper cable guide 30 of FIG. 1 and into the cable. The more the technician threads the adjusting mechanism 52 into the cable guide lock 48, the deeper the cutting wheel 18 cuts into the cable 12.

Figure 3:
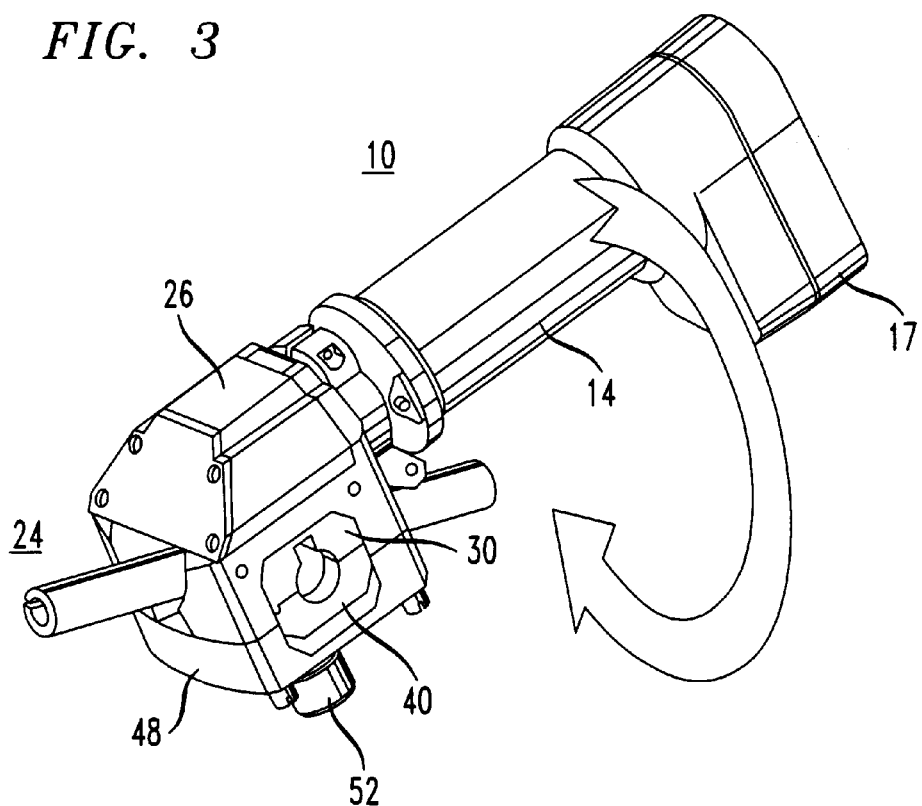
FIG. 3 illustrates the method of making a circumferential sheath cut with the fiber optic sheath removal tool of the invention.

Referring to FIG. 3, a technician operates the tool 10 to make a circumferential sheath cut by first placing the cable 12 in the transverse channels 38 and 44 (see FIG. 1) of the lower and upper cable guides 30 and 40, respectively. Next, the technician places the upper and lower cable guides 30 and 40 (with the cable 12 circumscribed thereby) into the bottom of the housing 24 so that the cutting wheel 18 extends into the slot 35 in the upper cable guide with the motor shaft 18 of FIG. 1 parallel to the longitudinal cable axis. Thereafter, the operator secures the cable guide lock 48 to the bottom of the housing 24 and then manipulates the adjusting mechanism 52 to assure the proper cutting depth. Finally, the operator rotates the tool 10 relative to the cable 12 about the circumference of the cable to effect a circumferential sheath cut.

Figure 4:
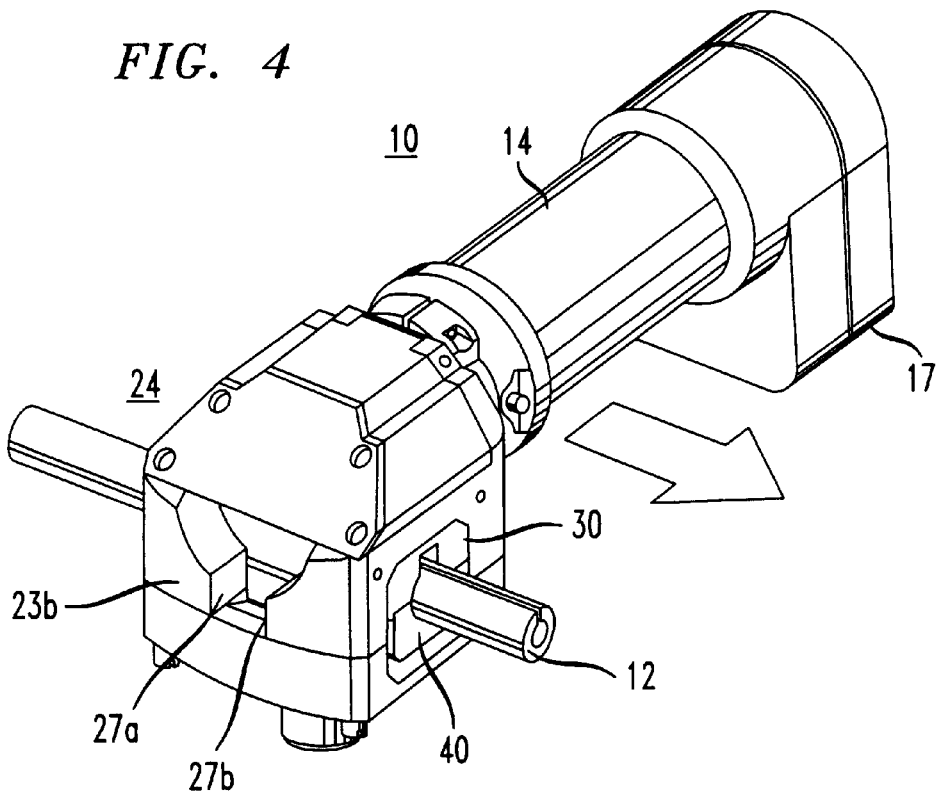
FIG. 4 illustrates the method of making a longitudinal sheath cut with the fiber optic sheath removal tool in accordance with the invention.

Referring to FIG. 4, a technician effects a longitudinal sheath cut by first placing the cable 12 in the longitudinal channels 36 and 42 (see FIG. 1) of the upper and lower cable guides 30 and 40, respectively. Next, the technician places the upper and lower cable guides 30 and 40 (with the cable 12 circumscribed thereby) into the bottom of the housing 24 so that the cutting wheel 18 (see FIG. 1) extends into the slot 35 (see FIG. 1) in the upper cable guide 30 with the face of the cutting wheel parallel to the longitudinal cable axis. Thereafter, the operator secures the cable guide lock 48 to the bottom of the housing 24 and then manipulates the adjusting mechanism 52 to assure the proper cutting depth. Finally, the operator displaces the tool 10 relative to the cable 12 in a direction parallel to the longitudinal cable axis.

The foregoing discloses a tool 10 for accomplishing both longitudinal and circumferential sheath cuts in a fiber optic cable 12 with improved safety and precision.

It is to be understood that the above-described embodiments are merely illustrative of the principles of the invention. Various modifications and changes may be made thereto by those skilled in the art that will embody the principles of the invention and fall within the spirit and scope thereof. For example, while the tool 10 has been described with respect to making circumferential and longitudinal sheath cuts in the fiber optic cable, the tool can easily be employed to make sheath cuts in other types of cable, and in cylindrical objects generally.

What is claimed is:

1. A tool for making at least one of a longitudinal and circumferential sheath cuts in a cylindrical member comprising:

a rotary driven cutting wheel for rotation about an axis;

a housing in spaced relationship from the cutting wheel such that a portion of the cutting wheel extends into the top of the housing, the housing having openings in its sides and ends to permit the cylindrical object to pass therethrough in a transverse direction that is parallel to said cutting wheel rotational axis and a longitudinal direction perpendicular to the axis of cutting wheel rotation;

upper and lower guides for receipt within said housing to circumscribe the cylindrical object to maintain the object fixed in one of the transverse and longitudinal directions to enable the cutting wheel to make one of a circumferential and longitudinal cuts, respectively, in said object; and a guide lock for releasable mounting to the bottom of the housing to retain said guides in said housing; and an adjustment mechanism for displacing said guides towards said cutting wheel to control the depth of cut of said wheel into said object.

2. The tool according to claim 1 further including:

a motor for driving the cutting wheel a rechargeable energy source for powering said motor.

3. The tool according to claim 1 wherein the housing has an open top and wherein the tool further includes a cover releasably sealing the top of the housing.

4. The tool according to claim 1 wherein upper and lower guides have opposed longitudinal and transverse channels for retaining the cylindrical member in said longitudinal and transverse positions, respectively.

5. The tool according to claim 4 wherein said longitudinal and transverse channels are half-rounded for receiving a cylindrical object of a prescribed diameter.

6. The tool according to claim 1 wherein a single pair channel guides allow separate longitudinal and circumferential cuts on the same cylindrical object.

7. The tool according to claim 1 wherein the adjustment mechanism comprises a threaded shaft having a knob at one end, the shaft extending through the cable guide lock to displace the cable guides toward the cutting wheel.

8. The tool according to claim 1 wherein the cable guide is releasably retained to the bottom of the housing by threaded fasteners.

9. A method for making a precise cut about the circumference of a cylindrical object (a "circumferential cut") with a cutting wheel that rotates about an axis, comprising the steps of:

seating the cylindrical object in opposed channels in upper and lower guides, the channels each extending along a first axis;

receiving the upper and lower guides in a housing having an open bottom and an open top into which the rotary-driven cutting wheel extends to extend at least in part into the upper guide member so that the cutting wheel axis of rotation is parallel to the first axis along which the channels extend to enable the cutting wheel to make a circumferential cut in said object once said object contacts the cutting wheel;

releasably securing a guide lock to the bottom of the housing to retain guides in a fixed relationship relative to the cutting wheel;

manipulating an adjusting mechanism carried by the guide lock to displace the guide members, and the object circumscribed thereby, towards the cutting wheel to control the depth of cut by said wheel;

rotating the cutting wheel relative to the object about the first axis to cut the object about its circumference.

10. The method according to claim 9 further including the steps of:

releasing the guide lock and withdrawing the object therefrom;

circumscribing the cylindrical object in opposed longitudinal channels in upper and lower guides;

receiving the upper and lower guides in a housing having a open bottom and an open top into which a rotary-driven cutting wheel extends at least in part into the upper guide member with is axis perpendicular to the axis of the object for making a cut longitudinal cut therein once said object contacts the cutting wheel;

releasably securing a guide lock to the bottom of the housing to retain guides in a fixed relationship relative to the cutting wheel;

manipulating an adjusting mechanism carried by the guide lock to displace the guide members, and the object circumscribed thereby, towards the cutting wheel to control the depth of cut by said wheel;

displacing the cutting wheel relative to the object along its axis to cut the object longitudinally.

11. A method for making a precise longitudinal cut in a cylindrical object along its longitudinal axis with a cutting wheel that rotates about an axis generally perpendicular to the longitudinal axis of the object, comprising the steps of:

circumscribing the cylindrical object in opposed longitudinal channels in upper and lower guides;

receiving the upper and lower guides in a housing having an open bottom and an open top into which a rotary-driven cutting wheel extends at least in part into the upper guide member with its axis perpendicular to the axis of the object for making a longitudinal cut therein once said object contacts the cutting wheel;

releasably securing a guide lock to the bottom of the housing to retain guides in a fixed relationship relative to the cutting wheel;

manipulating an adjusting mechanism carried by the guide lock to displace the guide members, and the object circumscribed thereby, towards the cutting wheel to control the depth of cut by said wheel;

displacing the cutting wheel relative to the object along the longitudinal axis of the object to cut the object longitudinally.

12. The method according to claim 11 further including the steps of:

releasing the guide lock and withdrawing the object therefrom; seating the cylindrical object in opposed channels in upper and lower guides, the channels each extending along a first axis;

receiving the upper and lower guides in a housing having an open bottom and an open top into which the rotary-driven cutting wheel extends at least in part into the upper guide member so that the cutting wheel axis of rotation is parallel to the transverse channels to enable the cutting wheel to make a circumferential cut in said object once said object contacts the cutting wheel;

releasably securing a guide lock to the bottom of the housing to retain guides in a fixed relationship relative to the cutting wheel;

manipulating an adjusting mechanism carried by the guide lock to displace the guide members, and the object circumscribed thereby, towards the cutting wheel to control the depth of cut by said wheel;

rotating the cutting wheel relative to the object about the longitudinal axis of the object to cut the object about its circumference.

* * * * *